United States Patent
Ogino et al.

(10) Patent No.: US 10,862,377 B2
(45) Date of Patent: Dec. 8, 2020

(54) GROUNDING STRUCTURE FOR DRIVING UNIT OF MOTOR-DRIVEN VEHICLE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki (JP)

(72) Inventors: Daizo Ogino, Tokyo (JP); Masahiro Matsushita, Tokyo (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki (JP)

( * ) Notice: Subject to any disclaimer, the term of this patent is extended or adjusted under 35 U.S.C. 154(b) by 264 days.

(21) Appl. No.: 15/915,311

(22) Filed: Mar. 8, 2018

(65) Prior Publication Data

US 2018/0287467 A1   Oct. 4, 2018

(30) Foreign Application Priority Data

Mar. 29, 2017   (JP) .................................. 2017-065187

(51) Int. Cl.
*H02K 11/40* (2016.01)
*H02K 7/00* (2006.01)
(Continued)

(52) U.S. Cl.
CPC ............ *H02K 11/40* (2016.01); *B60L 3/0061* (2013.01); *F16H 57/027* (2013.01); *H02K 7/006* (2013.01);
(Continued)

(58) Field of Classification Search
CPC .......... H02K 11/40; H02K 7/116; H02K 7/10; H02K 7/006; H02K 7/00; H02K 7/003;
(Continued)

(56) References Cited

U.S. PATENT DOCUMENTS

2013/0255422 A1*  10/2013  Terauchi ................. E02F 9/123
                                                                                74/467

FOREIGN PATENT DOCUMENTS

EP      2 767 732 A1    8/2014
EP      3 279 515 A1    2/2018
(Continued)

OTHER PUBLICATIONS

Extended European Search Report dated Aug. 27, 2018 issued in the corresponding EP Application No. 18164182.0.
(Continued)

*Primary Examiner* — Maged M Almawri
*Assistant Examiner* — Alexander A Singh
(74) *Attorney, Agent, or Firm* — Birch, Stewart, Kolasch & Birch, LLP

(57) ABSTRACT

In a grounding structure for a driving unit of a motor-driven vehicle, the grounding structure includes an coupling portion provided to an machine casing and being coupled to a mechanism casing; a coupling portion provided to the mechanism casing and being coupled to the coupling portion of the machine casing; a circumference wall that forms a space by arranging the coupling portion of the machine casing and the coupling portion of the mechanism casing so as to face each other between machine casing and the mechanism casing; a casing hole through which the space communicates with an inside of the mechanism casing; a pressure release hole that releases a pressure of the space by causing the space to communicate with an outside of the
(Continued)

mechanism casing; and a grounding object that is disposed in the space and that grounds the rotating device.

6 Claims, 3 Drawing Sheets

(51) Int. Cl.
    *H02K 7/116*     (2006.01)
    *B60L 3/00*     (2019.01)
    *F16H 57/027*     (2012.01)
    *B60K 1/00*     (2006.01)
    *B60K 17/16*     (2006.01)
    *F16H 1/20*     (2006.01)
    *F16H 57/02*     (2012.01)

(52) U.S. Cl.
    CPC ............... *H02K 7/116* (2013.01); *B60K 1/00* (2013.01); *B60K 17/165* (2013.01); *B60K 2001/001* (2013.01); *B60L 2210/40* (2013.01); *B60L 2270/147* (2013.01); *F16H 1/20* (2013.01); *F16H 2057/02034* (2013.01); *H02K 2205/09* (2013.01); *Y02T 10/64* (2013.01); *Y02T 10/72* (2013.01); *Y02T 90/16* (2013.01)

(58) Field of Classification Search
    CPC ... H02K 2205/09; B60L 2270/14; B60L 7/06; B60L 3/0061; B60L 2210/40; B60L 2270/147; F16H 57/027; F16H 57/028; F16H 1/20; F16H 2057/02034; Y10T 10/64; Y10T 10/72; Y10T 90/16; B60K 1/00; B60K 17/165; B60K 17/12; B60K 2001/001; B60R 16/02
    See application file for complete search history.

(56) References Cited

FOREIGN PATENT DOCUMENTS

| | | |
|---|---|---|
| JP | 2000-310296 A | 11/2000 |
| JP | 5943033 B2 | 6/2016 |
| WO | WO 2016/158199 A1 | 10/2016 |

OTHER PUBLICATIONS

Chinese Office Action and Search Report for Chinese Application No. 201810265202.7, dated Sep. 8, 2020, with English translation.

\* cited by examiner

GROUNDING STRUCTURE FOR DRIVING UNIT OF MOTOR-DRIVEN VEHICLE

CROSS-REFERENCE TO THE RELATED APPLICATION

This application incorporates by references the subject matter of Application No. 2017-065187 filed in Japan on Mar. 29, 2017 on which a priority claim is based under 35 U.S.C. § 119(a).

FIELD

The present invention relates to a grounding structure that grounds a rotating device included in a driving power transmission mechanism in a driving unit of a motor-driven vehicle.

BACKGROUND

As a driving unit mounted on a motor-driven vehicle, a combination of an inverter-controlled motor and a transaxle (driving power transmission mechanism) that transmits the rotating power of the motor to the vehicle shaft using a rotating device such as a gear and a shaft is known.

In such a motor-driven vehicle using a transaxle, on-off operation of a switching element in the inverter control induces a high-frequency noise. Such a high-frequency noise radiates from a rotating device, serving as an antenna, of the transaxle and may cause electromagnetic interference.

As a solution to the above, structures have been developed which inhibits radiation of the above high-frequency noise. For example, a structure that arranges the gear shaft of the transaxle to protrude the opposite side to the motor and lets a grounding brush the protrusion has been proposed. Another structure having been developed accommodates a brush in a casing independently of a casing of the transaxle and a breather mechanism is provided to adjust the pressure of the accommodating space (Japanese Patent No. 5943033).

Unfortunately, the above structures to suppress a possible noise may cause the following deficiencies.

Letting the gear shaft of the transaxle protrude to the opposite side to the motor and arranging the brush on the protrusion may increase the size of the driving unit (in particular, the size along the shaft direction).

Providing a casing to accommodate the brash independently of the casing of the transaxle may increase the number of parts and the costs. Forming the breather mechanism dedicated to the space accommodating the brush and being surrounded by the casing independently of a casing of the transaxle may increase the number of parts and the costs.

Accordingly, the grounding structure of the driving unit still admit improvement to inhibit complexity in structure.

SUMMARY

With the above problems in view, one of the objects of the present invention is to inhibit complexity in structure of the grounding structure of a driving unit of a motor-driven vehicle. In addition to the above, effects and advantages that are derived from the configurations to be described in the following "DESCRIPTION OF EMBODIMENTS" and that are not attained in the prior art can be regarded as another objects of the present invention.

(1) Here, as a generic feature there is provided a grounding structure for a driving unit of a motor-driven vehicle to be disclosed herein, the driving unit includes a dynamoelectric machine that outputs driving power to the rotating axis and a driving power transmission mechanism including a rotating device coupled to the rotating axis, the dynamoelectric machine being connected to the driving power transmission mechanism. The grounding structure includes: an coupling portion provided to an machine casing serving as an outer shell of the dynamoelectric machine and being coupled to a mechanism casing serving as an outer shell of the driving power transmission mechanism; a coupling portion provided to the mechanism casing and being coupled to the coupling portion of the machine casing; a circumference wall that forms a space by arranging the coupling portion of the machine casing and the coupling portion of the mechanism casing so as to face each other between machine casing and the mechanism casing; a casing hole through which the space communicates with an inside of the mechanism casing; a pressure release hole that releases a pressure of the space by causing the space to communicate with an outside of the mechanism casing; and a grounding object that is disposed in the space and that grounds the rotating device.

(2) As a preferable feature, the coupling portion of the machine casing may include a first coupling portion of the machine casing and a second coupling portion of the machine casing; the coupling portion of the mechanism casing may include a first coupling portion the mechanism casing to be coupled to the first coupling portion of the machine casing and a second coupling portion of the mechanism casing to be coupled to the second coupling portion of the machine casing; the circumference wall may be formed by arranging the first coupling portion of the machine casing and the first coupling portion of the mechanism casing so as to face each other; the grounding structure further may include a wall being formed by arranging the second coupling portion of the machine casing and the second coupling portion of the mechanism casing so as to face each other in the circumference wall and partitioning the space into a first space and a second space, and a communicating path through which the second space communicates with an outside of the second space; and the grounding object is disposed in the second space.

(3) As another preferable feature, the casing hole may be disposed outside the second space In this case, the communicating path may include the casing hole, the pressure release hole, and a penetrating hole through which an inside of the second space communicates with an outside of the second space. As an additional preferable feature, the communicating path may include the casing hole, the pressure release hole, and a second casing hole through which an inside of the mechanism casing communicate with the second space.

(4) As an additional preferable feature, the driving power transmission mechanism may include, as the rotating device, a counter shaft aligned with an input shaft coaxially arranged with the rotating shaft; and the grounding object may ground the counter shaft.

The present invention can inhibit complexity in structure of the grounding structure of a driving unit of a motor-driven vehicle using an existing structure.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

Description will now be made in relation to a vehicle structure according to a first embodiment. The following first embodiment is merely exemplary and does not intend to exclude various modifications and application of another technique that are not explicitly suggested in the description. Each element of the first embodiment can be variously modified and carried out without departing from the concept of the first embodiment. The Elements of the first embodiment can be selected or omitted according to the requirement and can also be combined occasionally.

The grounding structure of a first embodiment is provided to the driving system of a motor-driven vehicle. In this description, the motor-driven vehicle is exemplified by an electric vehicle.

I. First Embodiment

[1. Configuration]

Figure 1:
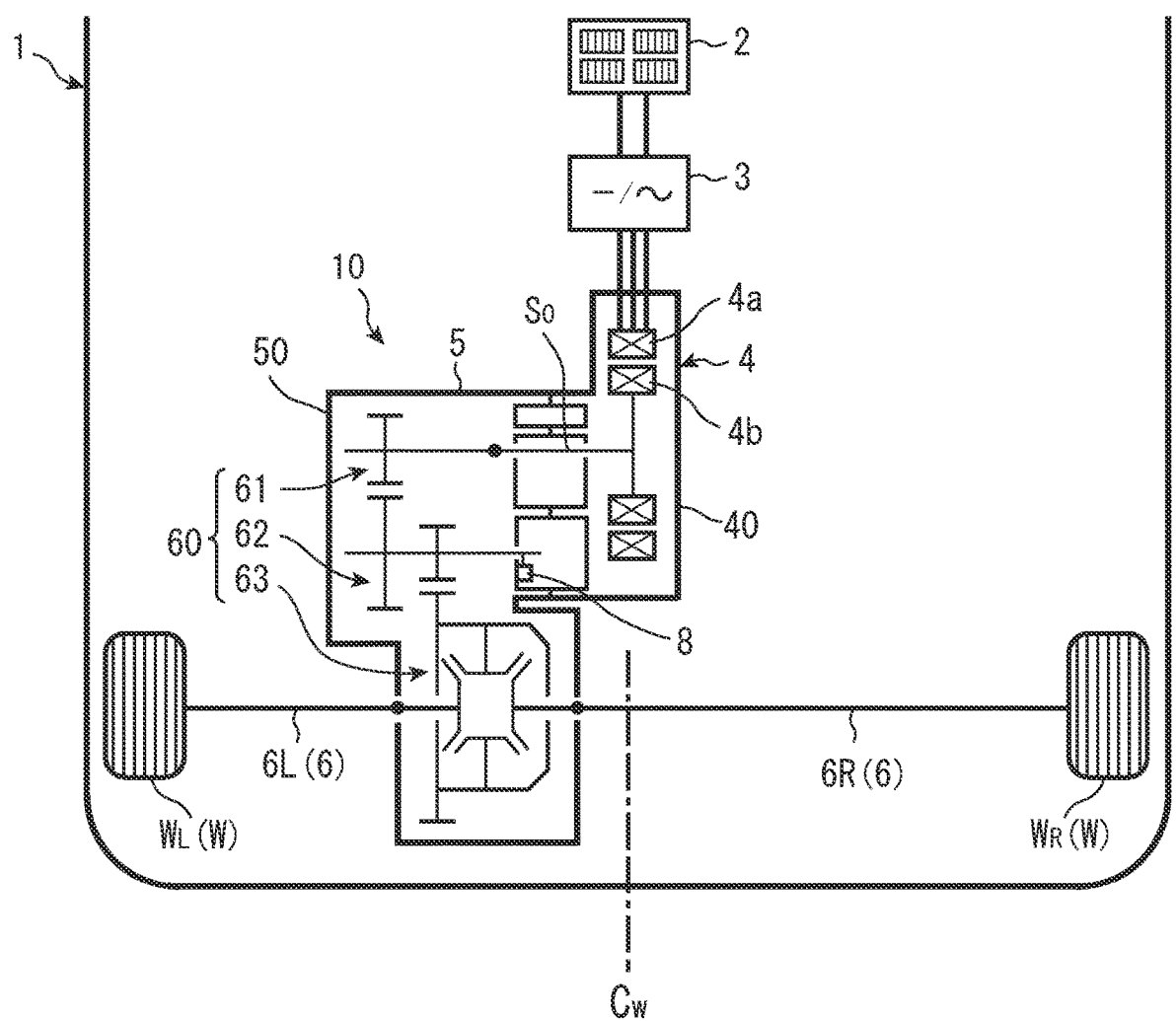
FIG. 1 is a skeleton diagram of an electric vehicle (motor-driven vehicle)

First of all, the overview of an electric vehicle 1 will now be described with reference to FIG. 1.

On the electric vehicle 1, a driving unit 10, which includes a motor 4 (dynamoelectric machine) serving as a driving source that outputs and receives electric power from a battery 2 via an inverter 3 and a transaxle 5 serving as a driving power transmission mechanism that transmits the rotating power to and from the motor 4 to a vehicle shaft 6 and wheels W is mounted.

In the driving unit 10, a casing 40 (machine casing) serving the outer shell of the motor 4 is formed in a separated form from a casing 50 (mechanism casing) serving as the outer shell of the transaxle 5, and the casings 40 and 50 are arranged so as to be adjacent to each other.

The motor 4 is a motor-generator that functions as an electric motor that outputs rotating power when the vehicle uses the power generated by the motor 4 to power run and also functions as a generator that receives regenerated rotation power and generates electric power when regeneration.

The transaxle 5 includes rotating devices 60 that transmit the rotation power from the motor 4, and connect thereto a vehicle shaft 6 that transmits the rotating power to wheels W.

Specifically, a left vehicle shaft 6L that rotates in company with the left wheel $W_L$ and a right vehicle shaft 6R that rotates in company with the right wheel $W_R$ extend along the width direction of the vehicle. The left vehicle shaft 6L and the vehicle right shaft 6R are connected to the rotating devices 60 of the transaxle 5.

When the vehicle uses the power generated by the motor 4 to power run, the rotating power output from the motor 4 is sequentially transmitted to the transaxle 5, the vehicle shaft 6, and the wheels W. When the motor 4 is regenerated, the rotating power from the wheels W is sequentially transmitted to the vehicle shaft 6, the transaxle 5, and the motor 4 reversely to the power transmission when the vehicle uses the power generated by the motor 4 to power run.

Furthermore, the driving unit 10 is provided with a brush 8, which electrically grounds the rotating devices 60 of the transaxle 5.

Hereinafter, detailed description will now be made in relation to each element included in the driving unit 10.

<Motor>

The motor 4 incorporates therein a stator 4a supplied with electric power from the inverter 3 and a rotor 4b that rotates with respect to the stator 4a. The stator 4a and the rotor 4b are accommodated inside the casing 40.

An outputting shaft $S_O$ (rotating shaft) is provided so as to penetrate the casing 40 towards the transaxle 5. The outputting shaft $S_O$ is coupled to the rotor 4b and outputs the rotating power of the motor 4.

In this example, the motor 4 is mounted on the center in the width direction (hereinafter referred to as "width-center") $C_W$ of the electric vehicle 1 when seen from the top.

The motor 4 is an alternating-current motor activated by alternating current and the rotating speed of the motor 4 is controlled by the inverter 3 (hereinafter referred to as "inverter-control"). The inverter-control converts the direct current of the battery 2 into alternating current through on-off operation of a switching element of the inverter 3.

During the inverter control, the on-off operation of the switching element induces a high-frequency noise. The high-frequency noise is transmitted to the rotating devices 60 of the transaxle 5, which will be detailed next, through rotor 4b and the outputting shaft $S_O$.

<Transaxle>

The transaxle 5 includes the rotating devices 60, which transmits power between the motor 4 and the vehicle shaft 6 and which is accommodated inside the casing 50. Inside the casing 50, the rotating devices 60, which are mechanically connected to the outputting shaft $S_O$ of the motor 4, are lubricated with oil to ensure the durability of the rotating devices 60.

Here, the transaxle 5 is assumed to output the rotating power whose rotating speed input from the motor 4 has been decelerated in two steps with three rotating devices 60. The transaxle 5 includes three rotating devices 60 of an input unit 61, an intermediate unit 62, and an outputting unit 63.

Hereinafter, detailed description will now be made in relation to the input unit 61, the intermediate unit 62, and the outputting unit 63 with reference to FIG. 2.

The input unit 61 is a rotating mechanism that receives the rotating power from the motor 4.

In the input unit 61, an inputting shaft $S_I$ connected (e.g., through fitting with a spline) to the outputting shaft $S_O$ of the motor 4 is supported by the casing 50 via bearings $B_{IL}$ and $B_{IR}$. An inputting gear $G_I$ is integrated with the inputting shaft $S_I$.

The intermediate unit 62 is a rotating mechanism that receives power from the input unit 61 and outputs the power to the outputting unit 63.

In the intermediate unit 62, the counter shaft $S_C$ provided in parallel with the inputting shaft $S_I$ is supported by the casing 50 through via bearings $B_{CL}$ and $B_{CR}$.

Here, the counter shaft $S_C$ is disposed such that the end of the counter shaft $S_C$ on the side of the motor 4 (right side in FIG. 2) protrudes to the outside of the casing 50 to install the brush 8 (grounding object), which will be detailed below. The counter shaft $S_C$ is wrapped with an oil seal to avoid leak of oil and intrusion of foreign matter at the position where the counter shaft $S_C$ penetrates the casing 50.

Two counter gears $G_{CL}$ and $G_{CR}$ are integrally connected to the counter shaft $S_C$.

The counter gear $G_{CL}$ is a first counter gear arranged so as to engage with the input gear $G_I$. The input gear $G_I$ and the first counter gear $G_{CL}$ rotate, engaging with each other, and achieve the first step deceleration.

The other second counter gear $G_{CR}$ is arranged alongside the first counter gear $G_{CL}$. In the illustrated example, the second counter gear $G_{CR}$ is arranged along the first counter gear $G_{CL}$ on the side of the motor 4 (right side of FIG. 2).

The rotating power of the second counter gear $G_{CR}$ is output to the outputting unit 63, which will be described the next.

The outputting unit 63 is a rotation mechanism that receives power from the intermediate unit 62 and that outputs the power to the vehicle shaft 6.

The outputting unit 63 bifurcates the rotating power of a single system input from the second counter gear $G_{CR}$ and outputs the bifurcated rotating power to two systems of the vehicle shafts 6L and 6R. The differential mechanism 64 is used as such a rotating power distributing mechanism.

A ring gear $G_R$ that is arranged so as to engage with the second counter gear $G_{CR}$ is provided to the differential mechanism 64. The second counter gear $G_{CR}$ and the ring gear $G_R$ rotate on, engaging with each other, and achieve the second step of deceleration.

The ring gear $G_R$ is integrated with a differential carrier 65 supported via bearings $B_{DL}$ and $B_{DR}$ by the differential carrier 65. In the illustrated example, the ring gear $G_R$ is coupled to the differential carrier 65 on the side of the motor 4 (right side in FIG. 2).

Inside the differential carrier 65, a pair of pinion gears $G_{P1}$ and $G_{P2}$ (differential pinions) and a pair of side gears $G_{SL}$ and $G_{SR}$ are pivotally supported.

The pinion gears $G_{P1}$ and $G_{P2}$ are arranged so as to engage with a pair of side gears $G_{SR}$ and $G_{SL}$ and rotates in conjunction with the differential carrier 65. The side gears $G_{SL}$ and $G_{SR}$ are coupled with the vehicle shafts 6L and 6R, and rotate, allowing a difference between the respective speeds.

Figure 2:
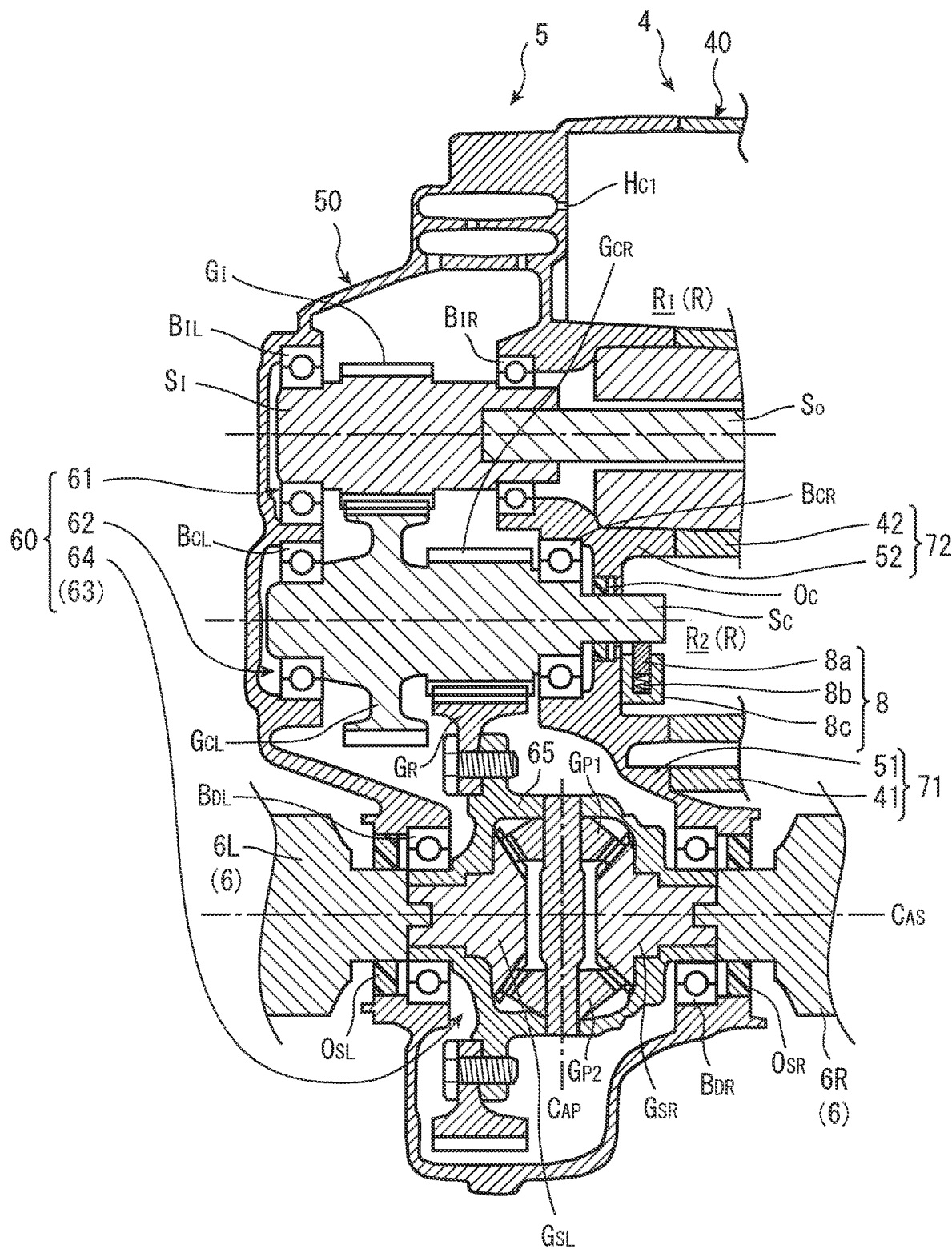
FIG. 2 is a sectional view of a transaxle (along the one-dot broken line of FIG. 3)

Specifically, the first pinion gear GP1 and the second pinion gear GP2 face each other in the differential carrier 65 and are arranged on the pinion axis center CAP (axis center vertically extending in FIG. 2).

The first side gear $G_{SR}$ and the second side gear $G_{SL}$ face each other in the differential carrier 65 and are arranged on the side axis center CAP (axis center horizontally extending in FIG. 2) CAS perpendicular to the pinion axis center CAP.

A first side gear $G_{SL}$ is integrated with the left vehicle shaft 6L and a second gear $G_{SR}$ is integrated with the right vehicle shaft 6R.

Oil seals $O_{SL}$ and $O_{SR}$ are provided around the points where the side gears $G_{SL}$ and $G_{SR}$ are respectively connected to the vehicle shafts 6L and 6R, so that oil leaking from the casing 50 and intrusion of foreign object can be inhibited.

<Structure to Couple the Motor and the Transaxle>

Detailed description will now be made in relation to the structure to couple the motor 4 and the transaxle 5 to each other.

This coupling structure couples the casing 40 (hereinafter referred to as "machine casing 40") of the motor 4 and the casing 50 (hereinafter referred to as "mechanism casing 50") via coupling portions 41, 42, 51, and 52, which are provided to portions facing each other.

Specifically, the coupling portions 41 and 42 formed on the machine casing 40 are brought to face the coupling portions 51 and 52 formed on the mechanism casing 50, respectively, and are fastened to the coupling portions 51 and 52.

Hereinafter, description will now be made in relation to the coupling portions 41, 42, 51, and 52 with reference to FIGS. 2-4.

The coupling portions 41, 42, 51, and 52 are classified into two types of first coupling portions 41 and 51 (coupling portions) formed on the outer circumferences of the respective casings 40 and 50 and second coupling portions 42 and 52 formed on the inner circumferences of the respective casings 40 and 50.

The first coupling portions 41 and 51 are formed so as to protrude from the edges of the outer circumference of the respective corresponding casings 40 and 50. The first coupling portions 41 and 51 are further formed into ring-shaped when seen from the side. On the machine casing 40, the first coupling portion 41 is formed so as to protrude towards the transaxle 5. On the mechanism casing 50, the first coupling portion 51 is formed so as to protrude towards the motor 4.

The first coupling portions 41 and 51 have coupling faces 41a and 51a (top faces), which correspond to each other (i.e., having shapes overlapping each other when seen from the side). The coupling faces 41a and 51a are faced so as to be contact face with each other, and the motor 4 (machine casing 40) and the transaxle 5 (mechanism casing 50) face each other.

The above first coupling portions 41 and 51 are mainly in charge of coupling the casing 40 to the other casing 50 and serve as circumference walls 71 that form the outer wall between the machine casing 40 and the mechanism casing 50, respectively.

Under a state where the motor 4 and the transaxle 5 couple to each other by facing the first coupling portions 41 and 51 each other, a space R, which is enclosed by the first coupling portions 41 and 51, is formed between the machine casing 40 and the mechanism casing 50.

Inside the space R (i.e., inside the first coupling portions 41 and 51), the second coupling portions 42 and 52 are provided. In other words, the second coupling portions 42 and 52 are formed inside the first coupling portions 41 and 51, respectively.

The second coupling portions 42 and 52 are portions that circularly protrude from the casings 40 and 50, respectively, in the space R. Likewise the first coupling portions 41 and 51, the second coupling portion 42 is formed so as to protrude towards the transaxle 5 in the machine casing 40, and the second coupling portion 52 is formed so as to protrude towards the motor 4 in the mechanism casing 50.

The second coupling portions 42 and 52 have coupling faces 42a and 52a (top faces), which correspond to each other (i.e., having shapes overlapping each other when seen from the side). The coupling faces 42a and 52a are faced so as to be contact face with each other to auxiliarily couple the casings 40 and 50 and to forms a wall 72 serving as the inner wall in the space R. In the illustrated example, a circular wall 72 is formed inside the circumference wall 71, which is serving as the outer wall.

Under a state where the coupling faces 42a and the 52a of the second coupling portions 42 and 52 face each other (i.e., a state where the motor 4 is coupled to the transaxle 5), a second space $R_2$ enclosed by the second coupling portions 42 and 52 is formed.

Therefore, the space R is segmented into the second space $R_2$ enclosed by the wall 72 and the remaining space (the space outside the second space $R_2$ in the space R). The latter space (i.e., the space of the space R except for the second space R2) is referred to as a first space R1.

The wall 72 serves as a protecting wall that encloses and protects a brush 8 to be detailed below.

<Brush>

The brush 8 is a grounding body that electrically grounds at least one of the rotating devices 60. The brush 8 is disposed in the second space R2. Here, an object to be grounded by the brush 8 is assumed to be the counter shaft $S_C$.

The brush 8 includes a brush body 8a being in slidably contact with the rotating counter shaft $S_C$, a brush casing 8b that supports the brush body 8a, and a spring 8c (urging member) that urges the brush body 8a.

The brush body 8a is made of a conductive material that is connected (grounded) to the mechanism casing 50 via a lead. In contrast, the brush case 8b is made of an insulator and is attached to the mechanism casing 50.

The spring 8c is a compressed spring that urges the brush body 8a in the direction that push out the brush body 8a from the brush casing 8b.

The brush 8 can be installed in any direction (posture) as long as the brush body 8a is in contact with the counter shaft SC.

<Breather>

The pressure (internal pressure) of the mechanism casing 50 varies with increase in the temperature caused by fitting the rotating devices 60 and stirring the oil. Without a structure to manage this variation, there is a possibility of letting oil to blow from the oil seals OC, OSL, and OSR when the internal pressure rises.

In order to avoid such inconvenience, a breather structure 9 (communicating path) is provided to the transaxle 5 of the present embodiment.

The breather structure 9 is a mechanism through which the inside the mechanism casing 50 communicates with the outside of the mechanism casing 50. The breather structure 9 releases air from the mechanism casing 50 when the internal pressure rises and intakes air into the mechanism casing 50 when the internal pressure lowers.

To the breather structure 9, a pressure release hole $H_A$ through which the first space $R_1$ communicates with the outside in order to expose the first space $R_1$ to the atmosphere. The pressure release hole $H_A$ is formed by boring through the circumference wall 71.

For example, the first coupling portion 41 is cut out such that the first space $R_1$ is connected to the outside and thereby, the pressure release hole $H_A$ is formed. In the illustrated example, the pressure release hole $H_A$ is disposed at a lower portion of the circumference wall 71 so that foreign matters intruded into the first space $R_1$ through the pressure release hole $H_A$ is spontaneously ejected due to the action of gravity.

In addition to the above pressure release hole $H_A$, a first casing hole $H_{C1}$ through which the inside of the mechanism casing 50 communicates with the first space $R_1$ and a second casing hole $H_{C2}$ through which the inside of the mechanism casing 50 communicates with the second space $R_2$ are formed on the breather structure 9.

An segment of the inside of the mechanism casing 50 which segment is communicable through the first casing hole $H_{C1}$ also communicates with another segment of the inside of the mechanism casing 50 which segment is communicable through the second casing hole $H_{C2}$. The inside of the mechanism casing 50 has a labyrinth structure through which a large segment accommodating the rotating devices 60 communicates with the outside through small segments. The first casing hole $H_{C1}$ and the second casing hole $H_{C2}$ are bored on the walls of the small segments.

As described above, the inside of the mechanism casing 50 communicates with the first space $R_1$ through the first casing hole $H_{C1}$ and also communicates with the second space $R_2$ through the second casing hole $H_{C2}$. In other words, the second space $R_2$ communicates with the first space $R_1$ through the casing holes $H_{C1}$ and $H_{C2}$ and the inside of the mechanism casing 50. The first space $R_1$ communicates with the outside through the pressure release hole $H_A$.

Figure 3:
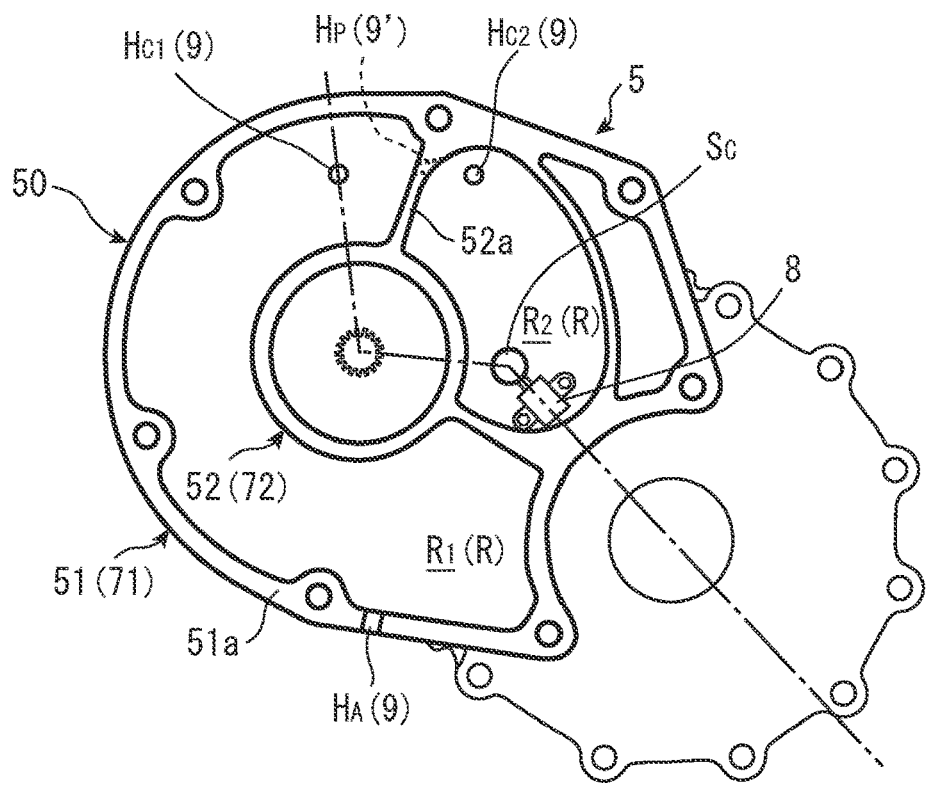
FIG. 3 is a side view of a transaxle seen from the side (side view seen from the side of the motor)
Figure 4:
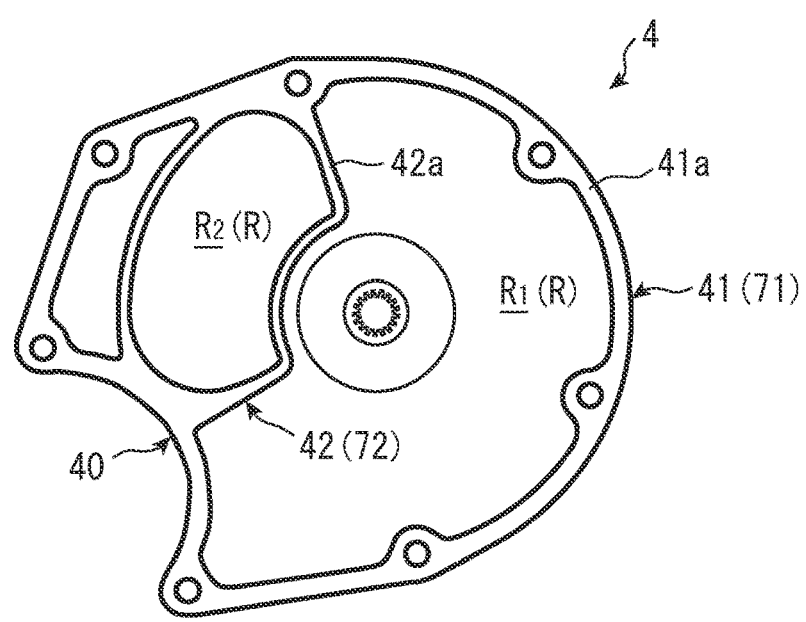
FIG. 4 is a side view of a motor (side view seen from the side of the transaxle).

As an alternative to the second casing hole $H_{C2}$, a breather structure 9' may be adopted which includes a penetrating hole $H_P$ through which the first space $R_1$ communicates with the second space $R_2$ and which is formed on the wall 72 as indicated by the broken line in FIG. 3. In this alternative, the inside of the mechanism casing 50 communicates with the first space $R_1$ through the first casing hole $H_{C1}$ and the second space $R_2$ communicates with the first space $R_1$ through the penetrating hole $H_P$.

2. Effects and Advantages

The above structure of this embodiment ensures the following effects and advantages.

(1) The counter shaft $S_C$ is grounded with the brush 8, so that propagation and radiation of high-frequency noise induced by the inverter control of the motor 4 can be suppressed, thereby inhibiting interference.

In addition to the above, arranging the brush 8 in the space R enclosed by the first coupling portions 41 and 51 (circumference wall 71) respectively protruding from the machine casing 40 and the mechanism casing 50 can ensure protectability for the brush 8.

Furthermore, the pressure release hole $H_A$ through which the space R communicates with the outside and the first casing hole $H_{C1}$ through which the inside of the transaxle 5 communicates with the space R are provided. With this structure, even when the temperature inside of the transaxle 5 rises, the presence of the holes $H_A$ and $H_{C1}$ can avoid rise in internal pressure. This inhibits oil from blowing through the oil seal $O_C$ attached to the counter shaft $S_C$, so that oil adhesion to the brush 8 can be suppressed. This further enhances the protectability for the brush 8.

The structures of the circumference wall 71, which is formed by the first coupling portions 41 and 51, the pressure release hole $H_A$, and the first casing hole $H_{C1}$ have been adopted in the driving unit of a traditional electric vehicle not having a brush 8. This means that the brush 8 can be arranged in the space R, which has been a dead space in the traditional structure, and also can be protected by using the traditional breather function. Consequently, there is no need to additionally provide the casing and the breather mechanism for the arrangement of the brush 8, so that the durability of the brush 8 can be ensured with a simple grounding structure.

Hereinafter, description will now be made in relation to the effects and advantages of the grounding structure of the driving unit 10 of this embodiment with reference to a detailed comparative example.

The brush 8 is disposed in the space R being formed between the machine casing 40 and the mechanism casing 50 and providing the breather structure 9, an increase in size (in the shaft direction) of the driving unit 10 can be avoided as compared with a structure that provides a brush on the opposite side of the motor with respect to the transaxle.

Furthermore, the grounding structure of this embodiment can escape from increasing the number of parts and the cost as compared with a structure that has a casing to accommodate the brash, which casing is separated from the mechanism casing and a structure that provides a dedicated breather mechanism to such a space being enclosed by a separated to casing and accommodating the brush.

(2) Arranging the brush 8 in the second space R2 enclosed by the second coupling portions 42 and 52 (wall 72) inward protruding from the first coupling portions 41 and 51 (circumference wall 71) can further enhance the protectability for the brush 8. In other words, the second coupling portions 42 and 52, which serve as the protection wall for the brush 8, are provided inside the first coupling portions 41 and 51 (circumference wall 71), which serve as a shielding wall to the outside. This double-wall structure can surely protect the brush 8.

Besides, the second coupling portions 42 and 52 auxiliarily couple the casings 40 and 50 to each other and accordingly contribute to certainly coupling the motor 4 to the transaxle 5.

Providing the breather structure 9 through which the second space $R_2$ communicates with the outside can surely suppress adhesion of oil to the brush 8.

(3) The second space $R_2$ of the breather structure 9 does communicate with the first space $R_1$ through the casing holes $H_{C1}$ and $H_{C2}$ and the inside of the mechanism casing 50, but does not directly communicate with the outside. This structure can surely prevent foreign matters entering through the pressure release hole $H_A$ from intruding into the second space $R_2$.

(4) In contrast, the second space $R_2$ of the alternative breather structure 9' does communicate with the first space $R_1$ through the penetrating hole $H_P$, but does not directly communicate with the inside of the casing 50. Accordingly, it is possible to surely prohibit oil and mist of the oil from intruding into the second space $R_2$ through the first casing hole $H_{C1}$.

As described above, the breather structure 9, 9' can surely enhance the protectability for the brush 8.

(5) The structure that an output shaft $S_O$ is connected to the input shaft $S_I$ on the side of the motor 4 makes it difficult to reserve a space near the end of the motor 4. The structure that the vehicle shafts 6 are connected to the both sides of the differential mechanism 64 in the vehicle width direction makes it possible to reserve a space at and near the ends of the vehicle width direction.

In contrast to the above, the counter shaft $S_C$, to which another shaft is not connected, easily reserve spaces at and near the both ends of the counter shaft $S_C$.

Since being aligned with the input shaft $S_I$, to which the output shaft $S_O$ of the motor 4 is connected, the counter shaft $S_C$ is arranged in vicinity of the motor 4. A preferable position at which the brush 8 disposed in the space R between the motor 4 and the transaxle 5 grounds is one end of the counter shaft $S_C$ on the side of the motor 4.

Conversely speaking, setting the grounding position to the end of the counter shaft $S_C$ on the side of the motor 4 allows the brush 8 to be arranged in the above space R. Furthermore, the degree of freedom for the layout of the brush 8 can be ensured.

II. Miscellaneous

Here, description will now be made in relation to another modification to this embodiment.

For example, the second coupling portions may be omitted from the above grounding configuration. In this alternative, since the space enclosed by the first coupling portion is not partitioned by the second coupling portions, the second casing hole and the penetrating hole can be omitted. The structure of the driving unit can further be simplified like this alternative. In this case, it is preferable that the brush 8 is disposed at the upper portion of the space so as to be distant from the pressure release hole as far as possible.

Alternative to a transaxle that decelerates in two steps, a mechanism (power transmission mechanism) that shifts the gears in one step or three or more steps may be applied. Alternatively, multiple counter shafts may be provided to a mechanism that shifts the gears in three or more steps and at least one of the counter shafts may be grounded by the brush. The object to be grounded by the brush is not limited to the counter shaft SC, and may be at least one of the rotating devices 60.

The wheels driven by the driving unit may be front wheels or rear wheels.

REFERENCE SIGNS LIST

1 electric vehicle (motor-driven vehicle)
2 battery
3 inverter
4 motor (dynamoelectric machine)
5 transaxle (driving power transmission mechanism)
6 vehicle shaft
8 brush (grounding object)
9,9' breather structure (communicating path)
10 driving unit
40 casing (machine casing)
41 first coupling portion (coupler)
41a first coupling face
42 second coupling portion
42a second coupling face
50 casing (mechanism casing)
51 first coupling portion (coupler)
51a first coupling face
52 second coupling portion
52a second coupling face
60 rotating device
61 input unit
62 intermediate unit
63 outputting unit
64 differential mechanism
65 differential carrier
71 circumference wall
72 wall
$G_{CL}$ first counter gear
$G_{CR}$ second counter gear
$G_I$ input gear
$G_R$ ring gear
$H_A$ pressure release hole
$H_{C1}$ first casing hole (casing hole)
$H_{C2}$ second casing hole
$H_P$ penetrating hole
R space
$R_1$ first space
$R_2$ second space
$S_O$ outputting axis (rotating axis)
$S_C$ counter axis
$S_I$ inputting axis
W wheel The invention thus described, it will be obvious that the same may be modified in many ways. Such variations are not to be regarded as a departure from the spirit and scope of the invention, and all such modifications as would be obvious to one skilled in the art are intended to be included within the scope of the following claims.

What is claimed is:

1. A grounding structure for a driving unit of a motor-driven vehicle, the driving unit including a dynamoelectric machine that outputs driving power to a rotating axis and a driving power transmission mechanism including a rotating device coupled to the rotating axis, the dynamoelectric machine being connected to the driving power transmission mechanism, the grounding structure comprising:

a machine casing serving as an outer shell of the dynamoelectric machine, the machine casing having a first machine casing coupling portion;

a mechanism casing serving as an outer shell of the driving power transmission mechanism, the mechanism casing having a first mechanism casing coupling portion, the first mechanism casing coupling portion being coupled to the first machine casing coupling portion;

the outer shell of the dynamoelectric machine and the outer shell of the driving power transmission mechanism forming a circumference wall by coupling the first mechanism casing coupling portion and the first machine casing coupling portion, the circumferential wall defining a space between opposing first walls of the machine casing and the mechanism casing;

the machine casing further having a second machine casing coupling portion;

the mechanism casing further having a second mechanism casing coupling portion coupled to the machine casing coupling portion;

the machine casing and the mechanism casing forming a second wall separating the space into a first space and a second space;

a first wall of the mechanism casing opposing a first wall of the machine casing defining a casing hole directly communicating an inside of the mechanism casing with the first space;

the circumferential wall defining a pressure release hole that communicates the first space with an outside of the circumferential wall;

the second wall defining a communication path that communicates that first space with the second space; and a grounding object that grounds the rotating device disposed in the second space.

2. The grounding structure according to claim 1, wherein:
the casing hole is disposed outside the second space; and
the second space is configured to communicate with the inside of the mechanism casing through the casing hole.

3. The grounding structure according to claim 2, wherein:
the driving power transmission mechanism includes, as the rotating device, a counter shaft aligned with an input shaft coaxially arranged with the rotating shaft; and
the grounding object grounds the counter shaft.

4. The grounding structure according to claim 1, wherein:
the casing hole is disposed outside the second space; and
the second space is configured to communicate with the inside of the mechanism casing through the communicating path and the casing hole.

5. The grounding structure according to claim 4, wherein:
the driving power transmission mechanism includes, as the rotating device, a counter shaft aligned with an input shaft coaxially arranged with the rotating shaft; and
the grounding object grounds the counter shaft.

6. The grounding structure according to claim 1, wherein:
the driving power transmission mechanism includes, as the rotating device, a counter shaft aligned with an input shaft coaxially arranged with the rotating shaft; and
the grounding object grounds the counter shaft.

* * * * *